J. G. SHROCK.
BIRD HOUSE.
APPLICATION FILED NOV. 12, 1919.

1,358,119.

Patented Nov. 9, 1920.
2 SHEETS—SHEET 1.

INVENTOR.
J. G. Shrock.
by Lacey & Lacey, Attys.

J. G. SHROCK.
BIRD HOUSE.
APPLICATION FILED NOV. 12, 1919.

1,358,119.

Patented Nov. 9, 1920.
2 SHEETS—SHEET 2.

INVENTOR.
J. G. Shrock.
by Lacey Harvey, Attys.

UNITED STATES PATENT OFFICE.

JOSEPH G. SHROCK, OF MATTOON, ILLINOIS.

BIRD-HOUSE.

1,358,119.  Specification of Letters Patent.  Patented Nov. 9, 1920.

Application filed November 12, 1919. Serial No. 337,412.

*To all whom it may concern:*

Be it known that I, JOSEPH G. SHROCK, a citizen of the United States, residing at Mattoon, in the county of Coles and State of Illinois, have invented certain new and useful Improvements in Bird-Houses, of which the following is a specification.

This invention relates to bird houses and the primary object of the invention is to provide an improved bird house constructed in such a manner that a number of rooms is provided in a structure of relatively small area so that a larger number of birds may be accommodated in a house of a given size than heretofore has been possible.

Another object of the invention is to provide an improved bird house having the partitions thereof arranged in a novel manner to provide a plurality of rooms, each of which opens directly on the outside of the building.

A further object of the invention is to provide an improved bird house having a plurality of separate rooms or compartments formed therein having the entrances thereof arranged in such a manner as to limit the amount of light entering said rooms, so as to provide relatively dark rooms, which have been found to be the most desirable in bird culture.

A still further object of the invention is to provide an improved bird house which can be quickly taken apart or assembled so as to permit the same to be shipped or stored in a knocked-down condition and thereby occupy a minimum amount of space.

A still further object of the invention is to provide an improved bird house of the above character which will present a novel and pleasing appearance, one which is durable and efficient in use, and one which can be manufactured and placed upon the market at a minimum cost.

With these and other objects in view, the invention consists in the novel construction, arrangement and formation of parts, as will be hereinafter more specifically described, claimed and illustrated in the accompanying drawings, forming a part hereof, in which—

Figure 1:
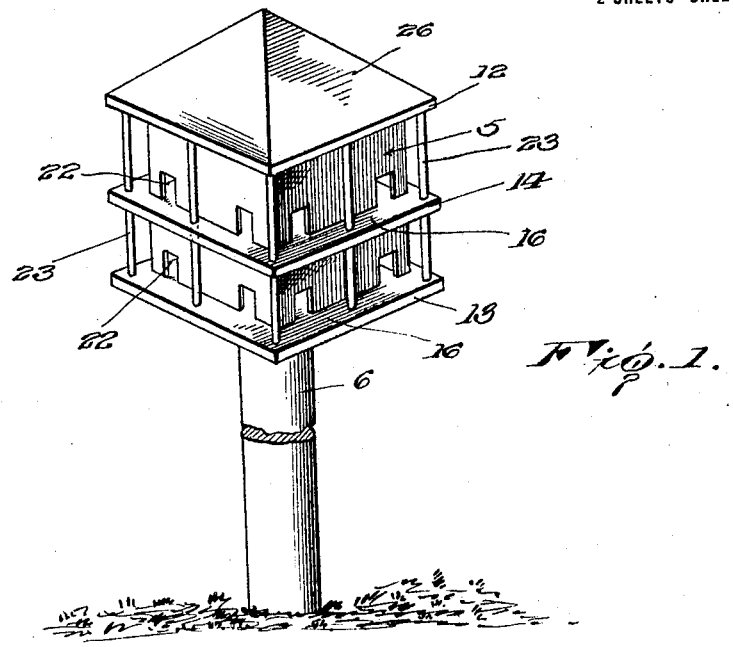
Figure 1 is a detail perspective view of the improved bird house.
Figure 2:
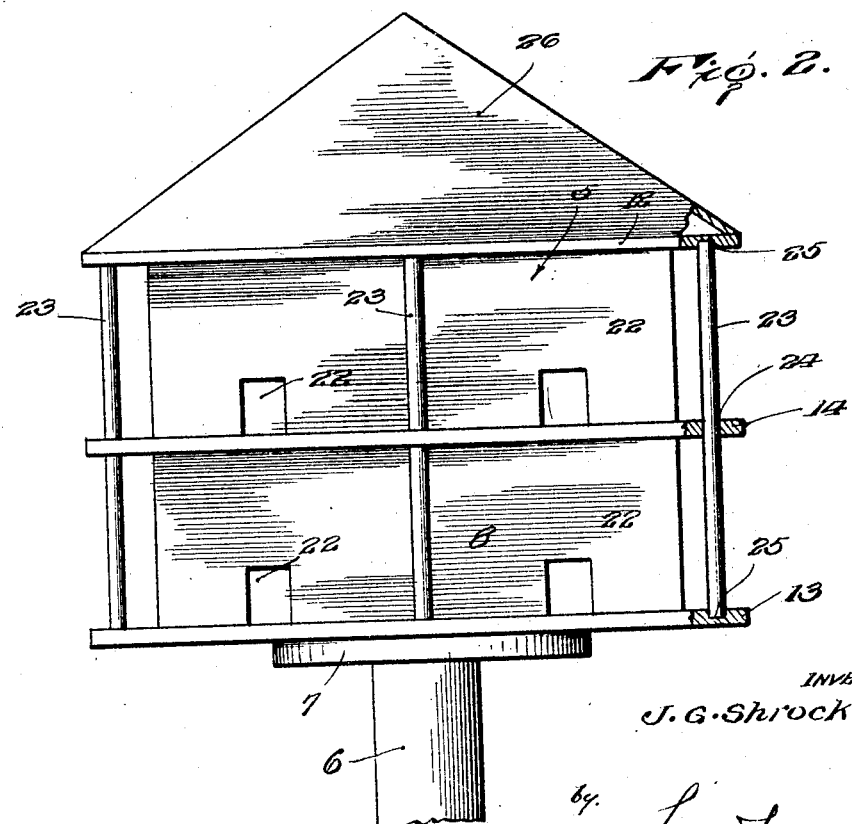
Fig. 2 is a side elevation of the house, showing parts of the same in section.
Figure 3:
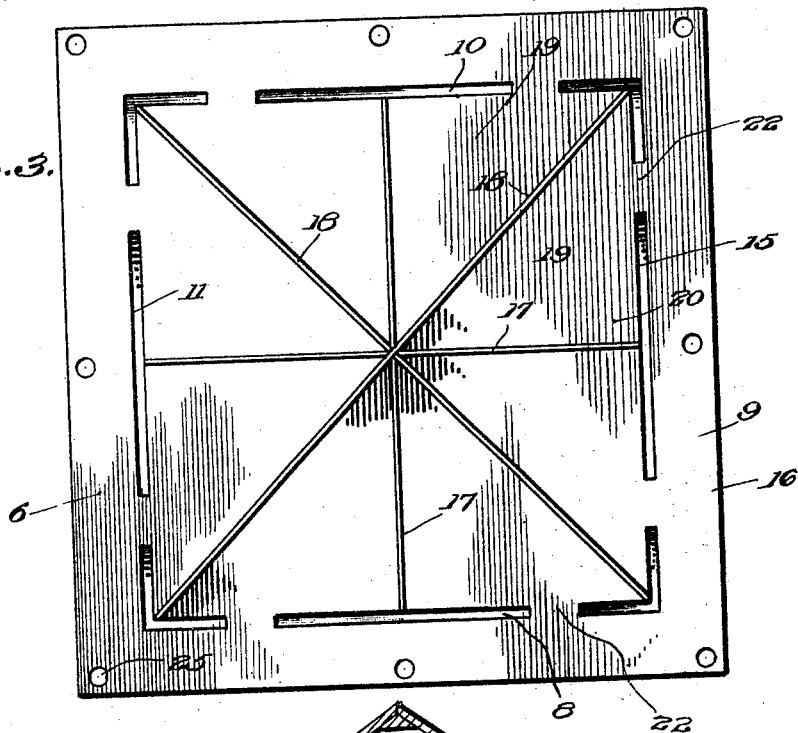
Fig. 3 is a plan view of the floor of the house.
Figure 4:
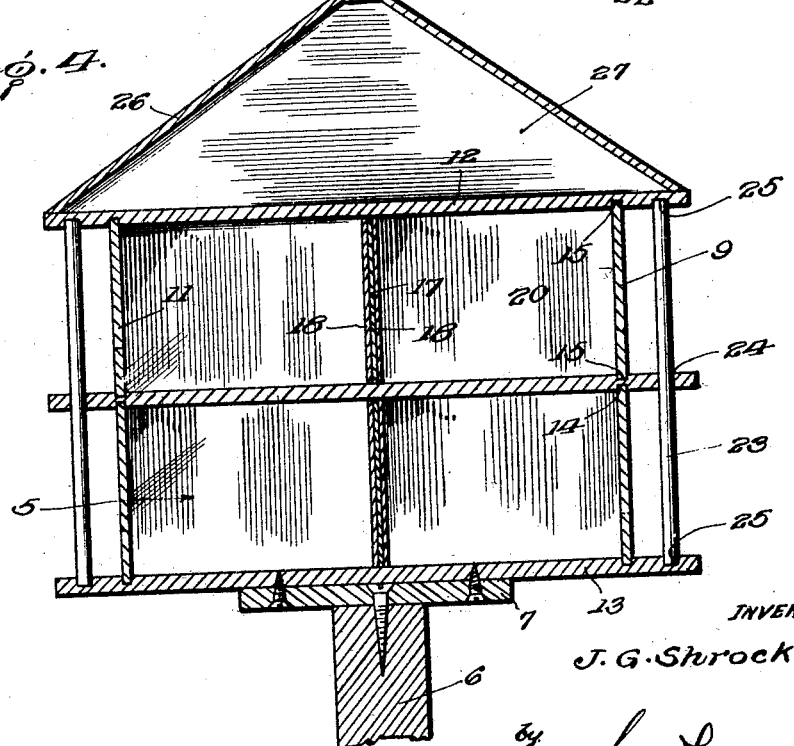
Fig. 4 is a central vertical section through the house.

Referring to the drawings in detail, where similar reference characters designate corresponding parts throughout the several views, the numeral 5 generally indicates the improved bird house, which is adapted to be held in position by any preferred means, which as shown in the drawings, is a supporting post 6 embedded in the ground. The upper terminal of the post 6 has secured thereto by any suitable fastening elements a base plate 7, which forms a relatively large supporting surface for the house 5.

The house 5 is of box-like construction and includes the side walls 8, 9, 10 and 11, and the upper, lower and intermediate walls 12, 13 and 14, which are arranged in spaced parallel relation. The upper surface of the lower wall 13, the lower surface of the upper wall 12 and the upper and lower surfaces of the intermediate wall 14 are provided with grooves 15 for the reception of the upper and lower edges of the side walls. The grooves 15 are arranged in spaced parallel relation to the side edges of the upper, lower and intermediate walls so as to space the side walls therefrom and thus provide a landing place or veranda 16 for the birds. As shown the house 5 includes two stories, but it is to be understood that the same can be constructed with any desired number of stories and when the number of stories is increased the number of intermediate partitions is likewise increased. The house 5 is divided into a number of compartments so as to form rooms for the reception of birds and these rooms are formed by the cross partitions 17, which extend from the central portion of one side wall to the opposite side wall. The house is further divided by diagonal partitions 18, which extend from one corner of the housing to the opposite corner. The partitions 17 form corner compartments 19 and the diagonal partitions 18 divide these compartments into sub-compartments 20, each of which is of adequate size and shape to permit a bird to build a nest therein.

The outer terminals of the cross partitions 17 and the diagonal partitions 18 engage the side wall and thus these partitions are held against movement in relation to each other and the side walls. Each compartment 19 is provided with an entrance 22 and the entrances are arranged adjacent to the corners of the sub-compartments so as to limit the amount of light entering these compartments. By forming the entrances adjacent the corners of the sub-compartments, the same are positioned directly in front of the diagonal partitions which form a screen to limit the entrance of light into these compartments. The entrances 22 open out on the veranda 16, as clearly shown in Fig. 1 of the drawings.

The top, bottom and intermediate walls 12, 13 and 14 are held in their assembled position by removable posts 23 which are arranged adjacent to the corners of the house and at the central portion of the side walls. The intermediate wall 14 is provided with openings 24 for the reception of the posts 23 and the inner surfaces of the upper and lower walls 12 and 13 are provided with sockets 25 for the reception of the terminals of the posts. The terminals of the posts are merely frictionally seated in the sockets so as to permit the ready knocking down of a house when desired, but it is to be understood that fastening elements may be provided if so desired.

The posts 23 not only form means for holding the house in assembled position, but also form a means of enhancing the appearance thereof, as owing to the position and form of the posts, the same present the appearance of pillars for the house.

A pyramidal shaped roof 26 is provided and the same rests upon the upper surface of the upper wall 12 and forms a dead-air space 27 above the compartments 19 and thereby prevents the interior of the house from becoming unduly heated by the sun's rays.

In assembling the improved bird house the side walls 8, 9, 10 and 11 are fitted in the grooves 15 in the lower wall 13 and the partitions 17 and 18 are then placed in position in engagement with the upper surface of the lower wall 13 and the side walls prevent relative lateral movement of the partitions in relation to each other. The intermediate wall 14 is then placed on the upper edges of the side walls in such a manner as to position the same in the grooves 15. The lower portions of the upper side walls are then placed in the grooves 15 formed in the upper surface of the intermediate wall and the lower portions of the upper partitions are placed on the intermediate wall. The posts 23 are then inserted through the openings 24 formed in the intermediate partition and in the sockets 25 formed in the upper surface of the lower wall 13. The upper wall is then placed on the upper portions of the upper side walls in such a manner as to position the edges of the upper side walls and partitions in the grooves 15 formed in the lower surface thereof and the upper terminals of the posts 23 are placed in the sockets 25 formed in the lower surface of the upper wall. The roof 27 is then placed in position on the upper wall and held in place by any suitable or preferred means.

In the foregoing description it can be seen that an improved bird house is provided of exceedingly simple and durable construction which can be readily taken apart or assembled and when the same is in its assembled condition displacement of the parts is absolutely prevented.

In practice I have found that the form of my invention illustrated in the accompanying drawings and referred to in the above description, as the preferred embodiment, is the most efficient and practical yet realizing that conditions concurrent with the adaptation of my device will necessarily vary, I desire to emphasize the fact that various minor changes in details of construction, proportion and arrangement of parts may be resorted to, when required, without sacrificing any of the advantages of my invention as set forth.

Having thus described the invention, what is claimed as new is:

1. A bird house of the class described comprising a box-like structure, a plurality of cross and diagonal partitions arranged in said box-like structure dividing the same into a plurality of separate compartments, and an entrance for each one of said compartments arranged adjacent to the relatively narrow portion thereof.

2. In a device of the class described, a casing including side walls, top, bottom and intermedate walls, and posts arranged to engage the top, bottom and intermediate walls to hold the same against displacement and relative movement in relation to each other, the top and bottom walls having sockets formed in their ends for the reception of the terminals of the posts.

In testimony whereof I affix my signature.

JOSEPH G. SHROCK. [L. S.]